July 31, 1934.   G. B. BENANDER   1,968,596
WIRE CLAMP

Filed June 22, 1933

Inventor:
George B. Benander,
by Harry E. Dunham.
His Attorney.

Patented July 31, 1934

1,968,596

UNITED STATES PATENT OFFICE 1,968,596

WIRE CLAMP

George B. Benander, Yalesville, Conn., assignor to Monowatt Electric Corporation, Bridgeport, Conn., a corporation of Connecticut Application June 22, 1933, Serial No. 677,062

3 Claims. (Cl. 24—115)

My invention relates to a wire clamp and more particularly to a wire clamp which is adapted to secure wires adjacent a floor board, a wall molding or a door frame.

The object of my invention is to provide a wire clamp of simple and inexpensive construction which is adapted for easy installation without the use of brads or tacks. A further object of my invention is to provide a wire clamp which is adapted to rigidly secure the wire in position regardless of irregularity in the spacing from the wall of the floor board, molding and the like. A still further object of my invention is to provide a wire clamp which will not become loosened by vibrations or by strains which may be placed on the wire in use.

What I consider to be novel and my invention will be better understood by reference to the following specification and appended claims when considered in connection with the accompanying drawing.

Figure 1:
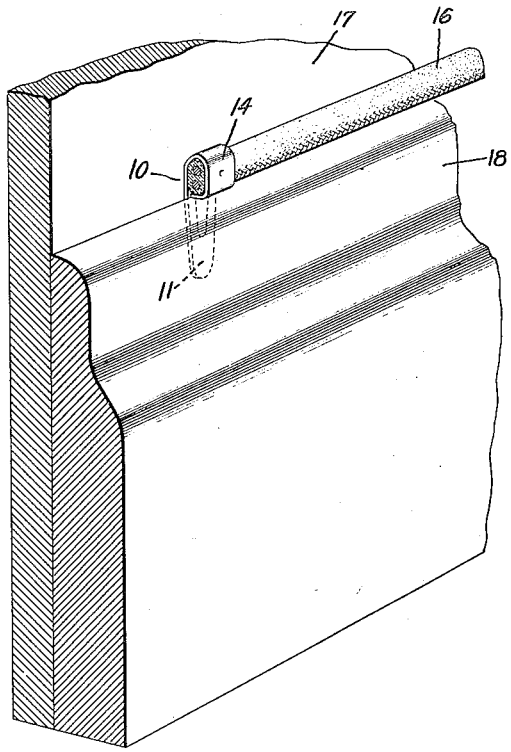
Figure 2:
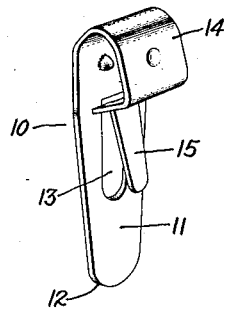

In the accompanying drawing, Fig. 1 is a perspective view of a section of a wall and floor board with the wire clamp of my invention securing a cord in position adjacent the floor board; Fig. 2 is a perspective view of the wire clamp.

Referring to the drawing, 10 indicates generally the wire clamp. 11 indicates the shank which is flat and tapered toward the lower end 12. An opening 13 is provided intermediate the two ends of the shank. Integral with shank 11 is a clamping portion 14 of general U-shape with the free end of the U spaced outwardly from the shank 11. A tongue 15 extends from the free end of the clamping portion 14 at an angle to the shank 11. In Fig. 1 a cord 16 is shown clamped in position by wire clamp 10 between a wall 17 and floor board 18. As indicated in this figure the clamping portion 14 is compressed and tongue 15 nests within the opening 13 provided in shank 11. If the floor board 18 were spaced from the wall 17 the clamping portion 14 would only be compressed sufficiently to permit the shank 11 and tongue 15 to enter between the floor board 18 and the wall 17 and thus the tongue 15 would engage the back of the floor board and the shank would be in engagement with the wall 17. Wire clamp 10 is made of spring metal and so formed that the tongue 15 is biased to a position spaced from shank 11. Thus the wire clamp 10 is securely fastened in position by frictional engagement with the wall and floor board even though there may be a considerable space between the two. Also, by the formation of the clamping portion 14 in U-shape and the top of the U connected to the shank 11, the wire or cable cannot slip out of the clamp regardless of whether the clamp is compressed to fully closed position or whether it is in the maximum open position. The clamp 10 is made of thin gage metal and the shank 11 provided with the opening 13 so that the tongue 15 may nest within the opening when the clamping portion is fully compressed and the thickness of the shank 11 will not be increased by the tongue 15 so that the clamp 10 may be driven in position even though the floor board is in close engagement with the wall.

What has been said above in connection with the use of this clamp between a floor board and the wall applies equally to the use of the clamp around the molding or the frame of a door or in other similar locations where two members are in surface contact and the clamp may be driven in between the two.

From the foregoing it will be seen that a wire clamp is provided of simple construction, easy to install, and which will rigidly secure a wire or cable in position regardless of irregularity in the spacing of the parts between which the clamp is located.

What I claim as new and desire to secure by Letters Patent of the United States, is:

1. A wire clamp comprising a flat shank, a clamping portion of U-shape integrally connected at one end to the shank and extending over the shank, and a tongue connected to the free end of said clamping portion, extending at an angle to the shank and movable to a position substantially parallel to the shank upon compression of the clamping portion.

2. A wire clamp comprising a flat shank having an opening intermediate its ends, a clamping portion integrally connected to the shank at one end and extending over the shank, and a tongue connected to the free end of said clamping portion and spaced from the shank, the tongue adapted to fit within the opening of the shank upon compression of the clamping portion.

3. A wire clamp comprising a flat shank having an opening intermediate its ends, a clamping portion of U-shape integrally connected to the shank at one end and extending over the shank, and a tongue connected to the free end of said clamping portion and biased to a position spaced from the shank, the tongue adapted to fit within the opening in the shank upon compression of the clamping portion.

GEORGE B. BENANDER.